(12) United States Patent
Xu et al.

(10) Patent No.: US 12,548,848 B2
(45) Date of Patent: Feb. 10, 2026

(54) EXPLOSION-PROOF SHEET OF SECONDARY BATTERY AND SECONDARY BATTERY

(71) Applicant: Hithium Tech HK Limited, Kowloon (HK)

(72) Inventors: Weidong Xu, Fujian (CN); Ziqi Yi, Fujian (CN); Zuyu Wu, Fujian (CN); Nan Zhang, Fujian (CN); Yang Tang, Fujian (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 679 days.

(21) Appl. No.: 17/950,546

(22) Filed: Sep. 22, 2022

(65) Prior Publication Data

US 2023/0113541 A1 Apr. 13, 2023

(30) Foreign Application Priority Data

Oct. 12, 2021 (CN) .......................... 202122458661.7

(51) Int. Cl.
*H01M 50/342* (2021.01)
*H01M 50/15* (2021.01)

(52) U.S. Cl.
CPC ....... *H01M 50/3425* (2021.01); *H01M 50/15* (2021.01); *H01M 2200/20* (2013.01)

(58) Field of Classification Search
CPC .......... H01M 50/3425; H01M 50/342; H01M 50/15; H01M 2200/20
See application file for complete search history.

(56) References Cited

U.S. PATENT DOCUMENTS

2011/0236734 A1  9/2011  Ikeda
2023/0026117 A1*  1/2023  Shu .................. H01M 50/3425

FOREIGN PATENT DOCUMENTS

| EP | 4167369 A1 | 4/2023 |
| KR | 20130130643 A | 12/2013 |
| WO | 2021120043 A1 | 6/2021 |

OTHER PUBLICATIONS

Office Action dated Jul. 6, 2023 received in European Patent Application No. EP 22197275.5.
Notification of Granting a New Type of Patent Right for Practical Use dated Mar. 11, 2022 received in Chinese Patent Application No. CN 202122458661.7.
Extended European Search Report dated Feb. 28, 2023 received in European Patent Application No. EP 22197275.5.

* cited by examiner

*Primary Examiner* — Eugenia Wang
(74) *Attorney, Agent, or Firm* — Scully, Scott, Murphy & Presser, P.C.

(57) ABSTRACT

An explosion-proof sheet of a secondary battery and a secondary battery are provided. The explosion-proof sheet has a main body portion, a fixing portion, and a cracking portion. The main body portion is opposite to the explosion-proof hole. A strengthening region is formed on the main body portion. The fixing portion is disposed around the main body portion, and the fixing portion is connected to a periphery of the explosion-proof hole. The cracking portion is located between the fixing portion and the main body portion and connected to the fixing portion and the main body portion.

16 Claims, 5 Drawing Sheets

EXPLOSION-PROOF SHEET OF SECONDARY BATTERY AND SECONDARY BATTERY

CROSS-REFERENCE TO RELATED APPLICATION

The present disclosure claims priority to and benefits of Chinese patent application CN2021224586617, filed on Oct. 12, 2021, the entire contents of which are incorporated herein by reference for all purposes. No new matter has been introduced.

TECHNICAL FIELD

The present disclosure relates to the technical field of batteries, and in particular to an explosion-proof sheet of a secondary battery and a secondary battery.

BACKGROUND

In recent years, with the rapid development of new energy industries, the field of batteries has been closely paid attention to. As a carrier for storing electrical energy, a battery can be used to store and transport electrical energy produced by a power plant, which is of great significance to the development of the new energy industry.

During the use of batteries, when a battery is overcharged, over-discharged, short-circuited or used in a harsh environment (such as, high temperature, high humidity, high pressure and low pressure environments), a large amount of gas will be generated inside the battery, and the temperature of the battery will rise sharply. As a result, an internal pressure of the battery increases, which will cause certain dangers to users. In the related field, in order to ensure the safety of a battery, an explosion-proof hole is generally formed in a top cover of the battery, and an explosion-proof sheet is covered at the explosion-proof hole. When an internal pressure of the battery reaches a threshold, the gas will blow open the explosion-proof sheet for pressure relief to ensure the safety of the battery. However, in daily use, a gas pressure inside the battery will change with the temperature of the environment where the battery is located, so that the explosion-proof sheet is constantly deformed under the action of different pressures. As a result, the structure of the explosion-proof sheet is prone to aging and becoming brittle due to frequent deformations. When the gas pressure inside the battery has not reached the threshold, the explosion-proof sheet cannot withstand the pressure and is damaged, and the battery is scrapped in advance, affecting the normal service life of the battery.

SUMMARY

The present disclosure discloses an explosion-proof sheet and a secondary battery, which can effectively reduce deformation of the explosion-proof sheet under different external pressure and lower the aging rate of the explosion-proof sheet.

To achieve the above purpose, an embodiment of the present disclosure provides an explosion-proof sheet of a secondary battery, the secondary battery including a top cover provided with an explosion-proof hole and; the explosion-proof sheet assembled on the top cover and used to close the explosion-proof hole, the explosion-proof sheet including a main body portion opposite to the explosion-proof hole, a strengthening region being formed on the main body portion; a fixing portion arranged around the main body portion and operatively connected to a periphery of the explosion-proof hole; and a cracking portion located between the fixing portion and the main body portion and connected to the fixing portion and the main body portion.

In one embodiment, in a thickness direction of the explosion-proof sheet, a thickness of the main body portion at other positions except for the strengthening region is $h_1$; a thickness of the main body portion at the strengthening region is $h_2$; and a thickness of the cracking portion is $h_3$, wherein $h_1$, $h_2$ and $h_3$ satisfy the relationship: $h_1 > h_2$ and $h_1 > h_3$.

In one embodiment, in a thickness direction of the explosion-proof sheet, a thickness of the main body portion at other positions except for the strengthening region is $h_1$; a thickness of the main body portion at the strengthening region is $h_2$; and a thickness of the cracking portion is $h_3$, wherein $h_1$, $h_2$ and $h_3$ satisfy the relationship: $h_1 \geq 2h_2$, $h_2 \geq h_3$.

In one embodiment, a material density of the main body portion at the strengthening region is greater than that of the main body portion at other positions.

In one embodiment, the strengthening region is formed on the main body portion in a squeezed manner, and the strengthening region is formed into a groove recessed relative to an upper surface of the main body portion, on the main body portion.

In one embodiment, the strengthening region extends from the middle part of the main body portion towards two sides of the main body portion; a projection area of the strengthening region on the main body portion is $S_1$; and an area of a surface of the main body portion that is provided with the strengthening region is $S_2$, wherein $S_1$ and $S_2$ satisfy the relationship: $5 \leq S_2/S_1 \leq 10$.

In one embodiment, a plurality of strengthening regions are provided, which are symmetrically arranged on the main body portion about a center of the main body portion; at least two strengthening regions are communicated in the middle of the main body portion to form a communicated region; and an area of the communicated region is $S_3$, wherein $S_2$ and $S_3$ satisfy the relationship: $80 \leq S_2/S_3 \leq 600$.

In one embodiment, a width of the groove is gradually increases along a direction from a lower surface of the main body portion to the upper surface of the main body portion; the upper surface and the lower surface are two opposite surfaces along the thickness direction of the main body portion; and the upper surface is a surface facing away from the inside of the battery.

In one embodiment, the groove has an inverted trapezoid section; and an included angle $\alpha$ between a side wall and groove bottom of the groove satisfies: $90° < \alpha < 180°$.

In one embodiment, a depth of the groove is H, $H \geq 0.5$ mm; a width of the groove bottom of the groove is $d_1$, $d_1 \leq 0.7$ mm; and a width of the groove located on the upper surface of the main body portion is $d_2$, wherein $d_2$ satisfies the relationship: $d_2 \leq 1$ mm.

In one embodiment, a width of a portion of the groove located on the upper surface is $d_2$, and a width of one side of the cracking portion facing towards the upper surface is $d_3$, wherein $d_2$ and $d_3$ satisfy the relationship: $d_2 \leq d_3$.

In one embodiment, the strengthening region has a first end and a second end; and at least one of the first end or the second end extends to an end part of the cracking portion and is communicated to the cracking portion.

In one embodiment, the explosion-proof sheet further includes a connection portion, which is located between the fixing portion and the main body portion and connected to the fixing portion and the main body portion; the connection portion is connected to an end part of the cracking portion; a thickness of the connection portion is h4; a thickness of the cracking portion is h3; and the thickness of other positions of the main body portion is h1, wherein h1, h3 and h4 satisfy the relationship: h1>h4>h3.

In one embodiment, a plurality of cracking portions and a plurality of connection portions are provided; the plurality of cracking positions are disposed at intervals; the plurality of connection portions are respectively connected between the plurality of cracking positions; and the thickness of each of the plurality of connection portions is equal, or the thickness of at least one connection portion is less than the thicknesses of other connection portions.

In one embodiment, the strengthening region has a first end and a second end; and the first end and the second end extend to a joint of the connection portion and the cracking portion, or the first end and the second end extend to the connection portion and are communicated to the connection portion.

In one embodiment, the connection portion and the cracking portion are connected to form an annular groove, which is an elliptical groove; the elliptical groove includes two straight grooves and two arc grooves; the two straight grooves are parallel to each other; the two arc grooves are respectively connected to two ends of the two straight grooves; and the straight grooves are formed into the connection portion, and the arc grooves are formed into the cracking portion.

In one embodiment, in a direction perpendicular to the explosion-proof sheet, the upper surface of the main body portion is a surface facing away from the inside of the battery; the strengthening region is formed on the upper surface of the main body portion; the lower surface of the main body portion is a plane; and the lower surface and the upper surface face away from each other.

According to another aspect of the present disclosure, a secondary battery is provided, which includes: a top cover, wherein an explosion-proof hole is formed in the top cover; and the explosion-proof sheet according to any one of above embodiments, the fixing portion of the explosion-proof sheet connected to a periphery of the explosion-proof hole; the main body portion of the explosion-proof sheet opposite to the explosion-proof hole; and the cracking portion of the explosion-proof sheet located in the explosion-proof hole.

Compared with known devices, the present disclosure offers the following benefits.

For example, the explosion-proof sheet includes the cracking portion connected between the fixing portion and the main body portion, so that when a pressure on the explosion-proof sheet is overly high (that is, a gas pressure in the sealed space between the housing and the top cover exceeds a threshold), the cracking portion can crack to enable the high-temperature high-pressure gas in the housing to be timely discharged and to control a cracking process of the explosion-proof sheet. The degree of cracking of the explosion-proof sheet is decreased, so as to reduce the influence caused when the explosion-proof sheet is damaged. Moreover, since the main body portion is provided with the strengthening region, the structural strength of the main body portion can be enhanced. Therefore, under an external force on the explosion-proof sheet, overall deformation of the main body portion 11 and the strengthening region is reduced, thus effectively reducing the deformation of the explosion-proof sheet under different pressures and lowering the aging rate of the explosion-proof sheet. The following phenomenon is also avoided: the cracking portion cracks in advance when the pressure has not reached a threshold, so as to prolong the service life of the battery.

DETAILED DESCRIPTION OF EMBODIMENTS

In order to ensure the safety of a secondary battery, an explosion-proof hole is formed in a top cover of the secondary battery, and an explosion-proof sheet is covered at the explosion-proof hole. When a pressure inside the secondary battery reaches a threshold, gas will rush away the explosion-proof sheet for pressure relief, so as to ensure the safety of the battery. In the related art, in order to reduce the weight of the secondary battery and minimize the volume, the thickness of a top cover will be usually reduced, so an explosion-proof sheet may be designed to be thinner, but this will decrease the structural strength of the explosion-proof sheet and cause the explosion-proof sheet to naturally deform. Furthermore, in daily use, a gas pressure inside a battery will change with the temperature of an environment where the battery is located, so that the explosion-proof sheet constantly deforms under the action of different pressures. As a result, the structure of the explosion-proof sheet is prone to aging and becoming brittle due to frequent deformations. When the gas pressure inside the battery has not reached the threshold, the explosion-proof sheet cannot withstand the pressure and is damaged, and the battery is scrapped in advance, affecting the normal service life of the battery.

Figure 1:
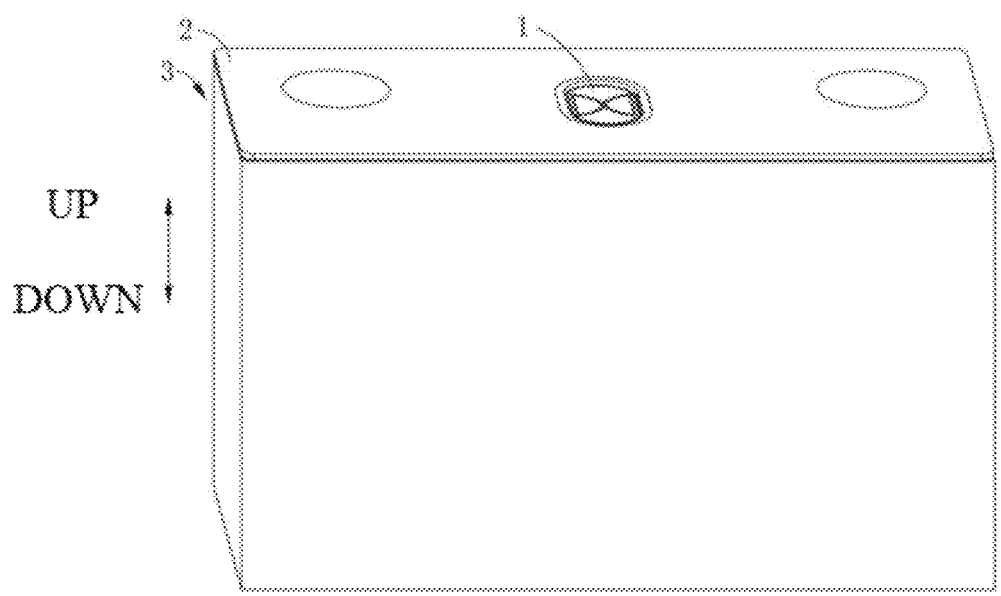
FIG. 1 is a schematic structural diagram of a secondary battery in an embodiment of the present disclosure.
Figure 2:
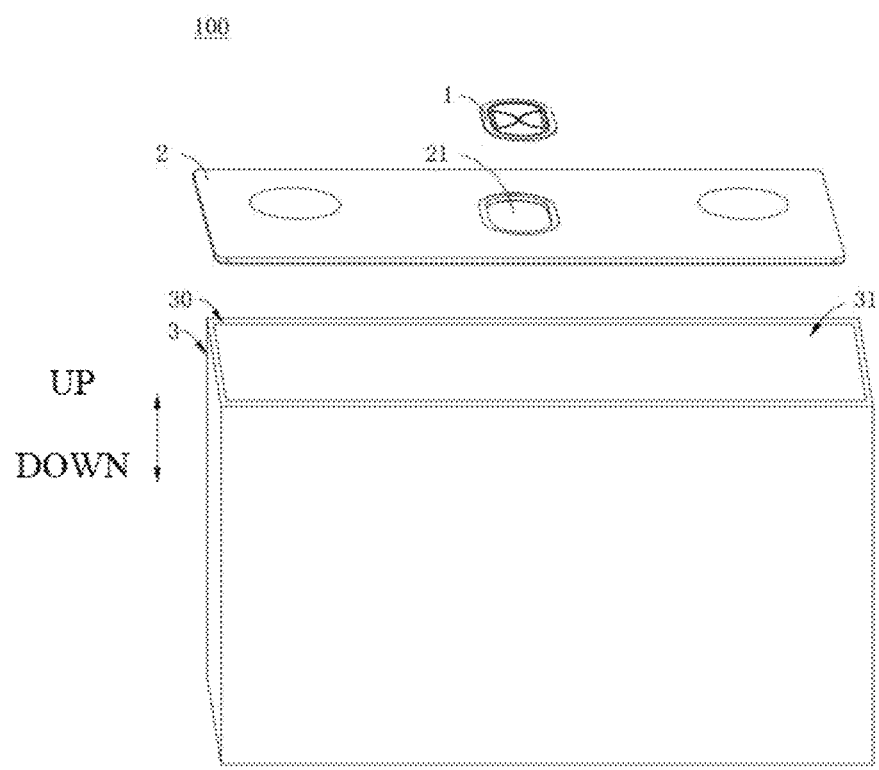
FIG. 2 is an exploded structural diagram of a secondary battery in an embodiment of the present disclosure.
Figure 3:
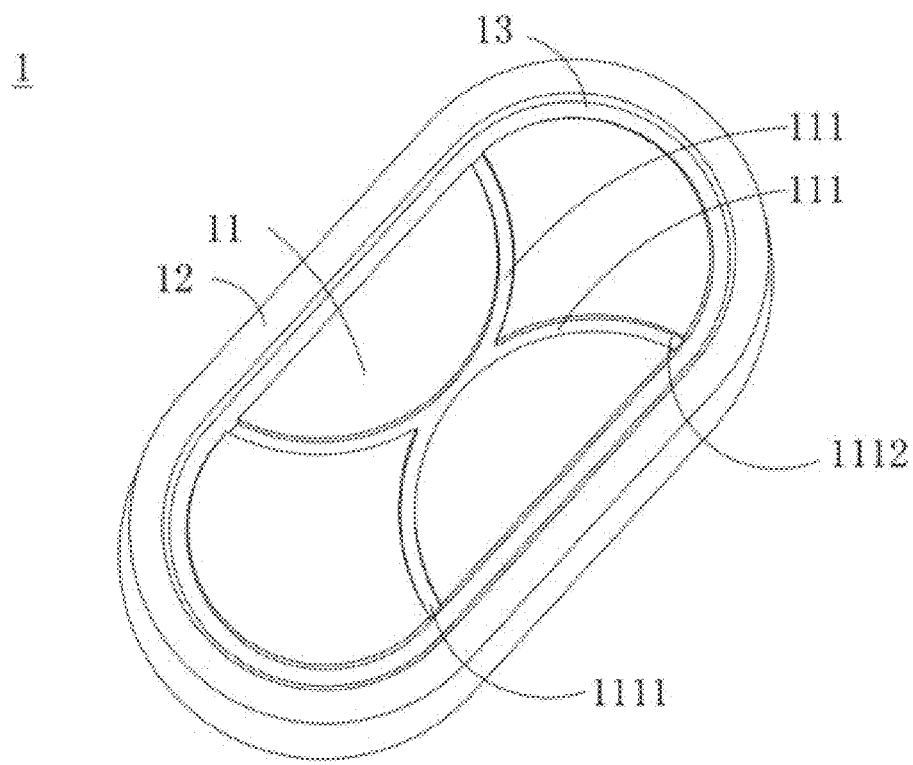
FIG. 3 is a schematic structural diagram of an explosion-proof sheet in an embodiment of the present disclosure.

Referring to FIG. 1 and FIG. 2, FIG. 1 is a schematic structural diagram of a secondary battery in an embodiment of the present disclosure, and FIG. 2 is an exploded structural diagram of a secondary battery in an embodiment of the present disclosure. The present disclosure provides a secondary battery 100. The secondary battery 100 includes an explosion-proof sheet 1, a top cover 2 and a housing 3; the top cover 2 is covered at an opening 30 of the housing 3, so that the top cover 2 and the housing 3 are encircled to form a sealed space 31. The sealed space 31 is used to accommodate a cell. In order to ensure the safety of the secondary battery 100, an explosion-proof hole 21 is formed in the top cover 2; the explosion-proof sheet 1 is connected to the top cover 2 to seal the explosion-proof hole 21, so as to seal a space between the top cover 2 and the housing 3. When an internal pressure of the secondary battery 100 reaches a threshold, gas inside the secondary battery 100 will blow away the explosion-proof sheet 1 and be released out of the secondary battery 100, so that internal and external gas pressures of the secondary battery 100 are balanced to avoid explosion of the secondary battery 100. In this embodiment of the present disclosure, the explosion-proof sheet 1 is improved, so that the anti-aging capacity of the explosion-proof sheet 1 is increased, thus lowering the possibility that the explosion-proof sheet 1 is cracked in advance during normal use of the secondary battery 100, lowering the likelihood that the secondary battery 100 is scrapped, and prolonging the service life of the secondary battery 100. Furthermore, the explosion-proof sheet 1 can be cracked faster and timelier when the pressure exceeds the threshold, so that the operation safety of the secondary battery 100 can be improved.

Next, the improved explosion-proof sheet 1 of the present disclosure will be explained below.

For the convenience of description, a side of the explosion-proof sheet 1 facing towards the outside of a battery is defined as an upper side, and a side of the explosion-proof sheet 1 facing towards the inside of the secondary battery 100 is defined as a lower side. As shown in FIG. 1 and FIG. 2, arrows in FIG. 1 and FIG. 2 show an up-down direction.

Referring to FIG. 3 to FIG. 8, an embodiment of the present disclosure further discloses an explosion-proof sheet 1. The explosion-proof sheet 1 includes a main body portion 11, a fixing portion 12 and a cracking portion 13. The main body portion 11 is opposite to the explosion-proof hole 21; a strengthening region 111 is formed on the main body portion 11; the fixing portion 12 is arranged around the main body portion 11, and the fixing portion 12 is used to be connected to a periphery of the explosion-proof hole 21; and the cracking portion 13 is located between the fixing portion 12 and the main body portion 11 and is connected to the fixing portion. 12 and the main body portion 11.

For example, the explosion-proof sheet 1 includes the cracking portion 13 connected between the fixing portion 12 and the main body portion 11, so that when a pressure on the explosion-proof sheet 1 is overly high (that is, a gas pressure in the sealed space 31 between the housing 3 and the top cover 2 exceeds a threshold), the cracking portion 13 can crack to enable the high-temperature high-pressure gas in the housing 3 to be timely discharged and to control a cracking process of the explosion-proof sheet 1. The degree of cracking of the explosion-proof sheet 1 is decreased, so as to reduce the influence caused when the explosion-proof sheet 1 is damaged. Moreover, since the main body portion 11 is provided with the strengthening region 111, the structural strength of the main body portion 11 can be enhanced. Therefore, under an external force on the explosion-proof sheet 1, overall deformation of the main body portion 11 and the strengthening region 111 is reduced, thus effectively reducing the deformation of the explosion-proof sheet 1 under different pressures and lowering the aging rate of the explosion-proof sheet 1. The following phenomenon is also avoided: the cracking portion 13 cracks in advance when the pressure has not reached a threshold, so as to prolong the service life of the battery.

It should be noted that when the explosion-proof sheet 1 is connected to the top cover 2, the explosion-proof sheet 1 will be covered on the explosion-proof hole 21. The main body portion 11 may be opposite to the explosion-proof hole 21, and the fixing portion 12 is hermetically fixedly connected to a portion of the top cover 2 close to the periphery of the explosion-proof hole 21. When the internal pressure of the secondary battery 100 reaches the threshold, the fixing portion 12 is still fixedly connected to the explosion-proof hole 21, and the cracking portion 13 may crack to enable the main body portion 11 and the fixing portion 12 to be partially or overall separated, so that a crack is formed on the explosion-proof sheet 1, and the gas pressure inside the secondary battery 100 is relieved out of the secondary battery 100 through the crack. This makes internal and external gas pressures of the secondary battery 100 balanced and avoids the secondary battery 100 from being exploded.

It should also be noted that the fixing portion 12 of the explosion-proof sheet 1 is hermetically connected to the periphery of the explosion-proof hole 21. For example, a mounting slot (not shown) is formed in an edge of a surface (an upper surface of the top cover 2 in FIG. 1) of the explosion-proof hole 21 facing away from the housing 3. A depth of the mounting slot is approximately the same as that of the explosion-proof sheet 1. The explosion-proof sheet 1 is embedded into the mounting slot, and the fixing portion 12 of the explosion-proof sheet 1 is welded with the mounting slot. Due to the arrangement of the mounting slot, on the one hand, the surface of the explosion-proof sheet 1 and the surface of the top cover 2 can be flush with each other; and on the other hand, a welding area between the fixing portion 12 of the explosion-proof sheet 1 and the mounting slot can also be enlarged. Therefore, the sealing property of the secondary battery 100 is improved. Of course, the explosion-proof sheet 1 can also be arranged at an edge of the explosion-proof hole 21 close to the housing 3 (i.e., the lower surface of the top cover 2 in FIG. 1). The gas inside the secondary battery 100 is discharged to the outside along a direction from bottom to top in FIG. 1. Therefore, the explosion-proof sheet 1 will be subjected to an upward impact force. At this time, the explosion-proof sheet 1 is arranged on the lower surface of the top cover 2, and the fixing portion 12 of the explosion-proof sheet 1 is connected to the edge of the explosion-proof hole 21, so that the edge of the explosion-proof hole 21 will also restrain the separation of the fixing portion 12 of the explosion-proof sheet 1 from the top cover 2. In this way, the explosion-proof sheet 1 and the top cover 2 are connected more firmly, and the use stability of the explosion-proof sheet 1 is improved.

In some embodiments, considering that the strengthening region 111 is used to enhance the structural strength of the main body portion 11, along a thickness direction of the explosion-proof sheet 1 (i.e., the up-down direction in FIG. 1), a thickness of the main body portion 11 at other positions except for the strengthening region 111 is $h1$; a thickness of the main body portion 11 at the strengthening region 111 is $h2$; and a thickness of the cracking portion 13 is $h3$, $h1 > h2$ and $h1 > h3$. That is, the thickness of the strengthening region 111 and the thickness of other positions of the main body portion 11 except for the strengthening region 111 are both greater than the thickness of the cracking portion 13. Therefore, when a pressure on the explosion-proof sheet 1 is greater than a threshold, the cracking portion 13 can crack before the main body portion 11, that is, the explosion-proof sheet 1 can start to crack from the cracking portion 13 to discharge high-temperature high-pressure gas inside the battery. The cracking process of the explosion-proof sheet 1 is highly controllable, and the explosion-proof sheet 1 is used stably and has high safety.

Further, the thickness $h1$ of the main body portion 11 at other positions except for the strengthening region 111 and the thickness $h2$ of the main body portion 11 at the strengthening region 111 can also satisfy: $h1 \geq 2h2$, so that the thickness $h2$ of the main body portion 11 at the strengthening region 111 may be smaller. As a result, the main body portion 11 can generate a great deformation when the pressure reaches the threshold since its overall structural strength is not overly high, and the cracking portion 13 can crack successfully, thus realizing a function of discharging the gas inside the secondary battery 100.

Further, due to h2≥h3, it can be ensured that the structural strength of the cracking portion 13 is less than that of the strengthening region 111. When the pressure on the explosion-proof sheet 1 is greater than the threshold, the cracking portion 13 can crack before the strengthening region 111, that is, the explosion-proof sheet 1 can start to crack from the cracking portion 13 to discharge the high-temperature high-pressure gas inside the battery. The cracking process of the explosion-proof sheet 1 is highly controllable, and the explosion-proof sheet 1 is used stably and has high safety.

In some implementations, the strengthening region 111 is formed on the main body portion 11 in a squeezed manner, and the strengthening region 111 is formed into a groove 14, which is recessed relative to an upper surface 112 of the main body portion 11, on the main body portion 11. The strengthening region 111 is formed on the main body portion 11 in the squeezed manner, so that the material density of the main body portion 11 at the strengthening region 111 is higher. For example, the material density of the main body portion 11 at the strengthening region 111 may be greater than that of the material density of the main body portion 11 at other positions except for the strengthening region 111. Even if the strengthening region 111 is a recessed groove 14, the structural strength at the strengthening region 111 can also be effectively ensured, so that the strengthening region 111 can play a structural strengthening role for the main body portion 11, which improves the anti-deformation capacity of the main body portion 11, reduces the aging of the cracking portion 13, improves the use stability of the explosion-proof sheet 1 and prolongs the service life.

It can be seen that the thickness of the main body portion 11 at the strengthening region 111 is less than the thickness of the main body portion 11 at other positions, that is, the strengthening region 111 is formed into the groove 14, but the strengthening region 111 is formed in the squeezed manner, which is equivalent that the material of the main body portion 11 at the strengthening region 111 is squeezed to obtain a higher material design, so that the structural strength at the strengthening region 111 is higher. Thus, the main body portion 11 at the strengthening region 111 is unlikely to deform, and the anti-deformation capacity of the main body portion 11 is improved.

Optionally, along the direction (i.e., the up-down direction) perpendicular to the explosion-proof sheet 1, the main body portion 11 has an upper surface 112 and a lower surface 113 that faces away from the upper surface 112. The upper surface 112 is a surface facing away from the inside of the battery. The above-mentioned strengthening region 111 may be formed on the upper surface 112 of the main body portion 11. Moreover, it can be known from the above that the strengthening region 111 is formed in the squeezed manner, that is, the lower surface 113 of the main body portion 11 is a plane. When a force exerted on the explosion-proof sheet 1 from the inside of the battery to the outside of the battery (i.e., from bottom to top) exceeds the threshold, two side walls 140 of the groove 14 (i.e., the strengthening region 111) are easily away from each other, so that the main body portion 11 is easier to upwards protrude, and the cracking portion 13 can generate large enough deformation to crack. Thus, the explosion-proof sheet 1 is easier to crack from the cracking portion 13. The cracking process of the explosion-proof sheet 1 is controllable, and the use stability is good.

In some embodiments, when the explosion-proof sheet 1 is pressed, the middle part of the main body portion 11 deforms most. Therefore, in order to improve the overall anti-deformation capacity of the main body portion 11, the structural strength of the middle part of the main body portion 11 needs to be improved. Based on this, the strengthening region 111 may extend from the middle part of the main body portion 11 towards two sides of the main body portion 11, so that the strengthening region 111 can effectively improve the structural strength of the middle region of the main body portion 11. Moreover, the strengthening region 111 extends from the middle part of the main body portion 11 towards two sides of the main body portion 11, so that the strengthening region 111 can be used to disperse the force exerted on the middle part of the main body portion 11 to the two sides of the main body portion 11. The overall force on the main body portion 11 is uniform, and the anti-deformation capacity of the main body portion 11 is improved.

Further, a projection area of the strengthening region 111 on the main body portion 11 is S1; and a surface area of a surface (i.e., the upper surface 112) of the main body portion 11 that is provided with the strengthening region 111 is S2. In order to enable the strengthening region 111 to realize the function of improving the overall structural strength of the main body portion 11 and in order to enable the main body portion 11 to generate, when the pressure on the explosion-proof sheet 1 is greater than the threshold, greater deformation to make the cracking portion 13 successfully crack, the overall structural strength of the main body portion 11 may not be overly high, and the projection area S1 of the strengthening region 111 on the main body portion 11 may not be overly large. Based on this, area S1 and area S2 may satisfy: 5≤S2/S1≤10. For example, S2/S1 may be: 5.0, 5.3, 5.5, 5.7, 6.0, 6.3, 6.5, 6.7, 7.0, 7.3, 7.5, 7.7, 8.0, 8.3, 8.5, 8.7, 9.0, 9.3, 9.5, 9.7 or 10.0.

Optionally, the strengthening region 111 may be formed into an arc section or a wavy section. When the secondary battery 100 is in normal use, at the same space, a length of the arc or wavy strengthening region 111 is much greater than that of a linear strengthening region 111. Therefore, the arc or wavy strengthening region 111 can resist the deformation of the main body portion 11 to a larger extent, which makes the stability of the main body portion 11 higher and lowers the failure probability of the explosion-proof sheet 1.

In addition, when the internal gas pressure of the secondary battery 100 reaches the threshold, the main body portion 11 may deform along a plurality of different directions. The arc or wavy strengthening region 111 can extend along a plurality of different directions, so that it can adapt to the deformation of the main body portion 11 in the plurality of different directions, and the anti-impact capacity of the main body portion 11 can also be improved.

It can be understood that there may be one or more strengthening regions 111, as long as the strengthening region 111 can be used to improve the overall structural strength of the main body portion 11 to make the overall structural strength of the main body portion 11 meet the design and use requirements. This embodiment does not specifically limit the number of the strengthening regions 111.

Exemplarily, there are a plurality of strengthening regions 111. The plurality of strengthening regions 111 may be symmetrically disposed on the main body portion 11 about a center of the main body portion 11, so that the strengthening effect of the strengthening regions 111 on the structural strength of the main body portion 11 is balance, and the stress on the main body portion 11 is uniform. Therefore, the stressing and cracking processes of the explosion-proof sheet 1 are easy to control, and the use safety and use stability of the explosion-proof sheet 1 are high.

Optionally, at least two strengthening regions 111 are communicated in the middle of the main body portion 11 to form a communicated region 111*a*, so that the force exerted on the middle part of the main body portion 11 can be dispersed to multiple sides of the main body portion 11 through the strengthening regions 111, so that the pressure on the main body portion 11 is more uniform, which further improves the use stability of the main body portion 11. Exemplarily, two arc strengthening regions 111 are taken as an example. For example, two C-shaped strengthening regions 111 are taken as an example. Openings of the two C-shaped sections face away from each other, so that the two C-shaped sections are symmetrically disposed about the center of the main body portion 11. It can be known from the foregoing that each strengthening region 111 is a recessed groove 14. Therefore, the two C-shaped sections may be communicated at the middle part of the main body portion 11 to form the communicated region 111*a*. The communicated region 111*a* at least partially covers the middle part of the main body portion 11, so that the communicated region 111*a* can effectively strengthen the middle part of the main body portion 11 and effectively improve the anti-deformation capacity of the main body portion 11 at the middle part.

Optionally, an area of the communicated region 111*a* should enhance the structural strength of the middle part of the main body portion 11 and also enable the main body portion 11 to generate great deformation when the pressure exceeds the threshold, so that the cracking portion 13 generates great deformation and cracks. Based on this, the area of the communicated region 111*a* is S3. Area S2 and area S3 may satisfy: 80≤S2/S3≤600. For example, an area ratio S2/S3 may be 80, 90, 100, 110, 130, 150, 170, 200, 230, 250, 270, 300, 330, 350, 370, 400, 430, 450, 470, 500, 530, 550, 570 or 600.

In some implementations, along a direction (i.e., an upward direction) from the lower surface 113 of the main body portion 11 to the upper surface 112 of the main body portion 11, a width of the groove 14 (i.e., the strengthening region 111) may gradually increase, so as to avoid the following: a great angle change at a joint between a groove bottom 141 of the groove 14 and a side wall 140 causes stress concentration when the explosion-proof sheet 1 is subjected to an exerted force, and early cracking occurs due to an extremely high local stress on the joint between the groove bottom 141 of the groove 14 and the side wall 140; and as a result, the battery is unduly scrapped. Therefore, the controllability of the cracking process of the explosion-proof sheet 1 is improved, so as to improve the use stability and safety of the explosion-proof sheet 1.

Exemplarily, a section of the groove 14 may be of an inverted trapezoid structure, so as to achieve an effect of reducing the angle change at the joint between the groove bottom 141 of the groove 14 and the side wall 140. In other words, an included angle α between the side wall 140 and groove bottom 141 of the groove 14 may satisfy: 90°<α<180°. For example, the included angle α can be 90°, 100°, 110°, 120°, 130°, 150°, 150°, 160°, 170° or 180°. It can be understood that a large included angle α indicates an improved stress concentration relieving effect of the groove 14, but the groove 14 may be wider. As a result, the projection area of the strengthening region 111 on the main body portion 11 is larger. When the included angle α is 120°, the stress concentration relieving effect of the groove 14 is good, and the groove 14 will not be overly wide because the included angle α is overly large.

Figure 4:
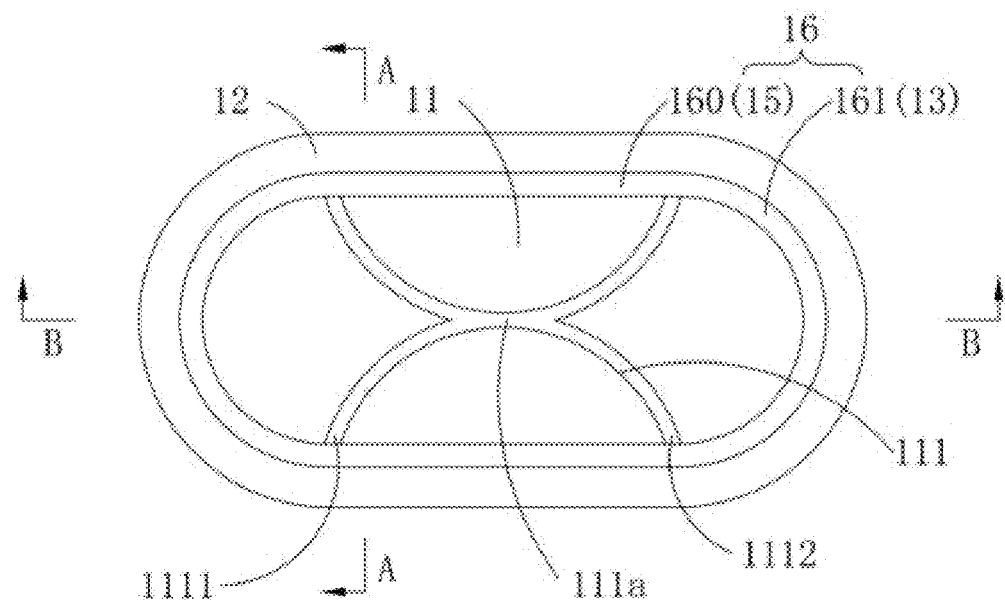
FIG. 4 is a top view based on the explosion-proof sheet in FIG. 3.
Figure 5:
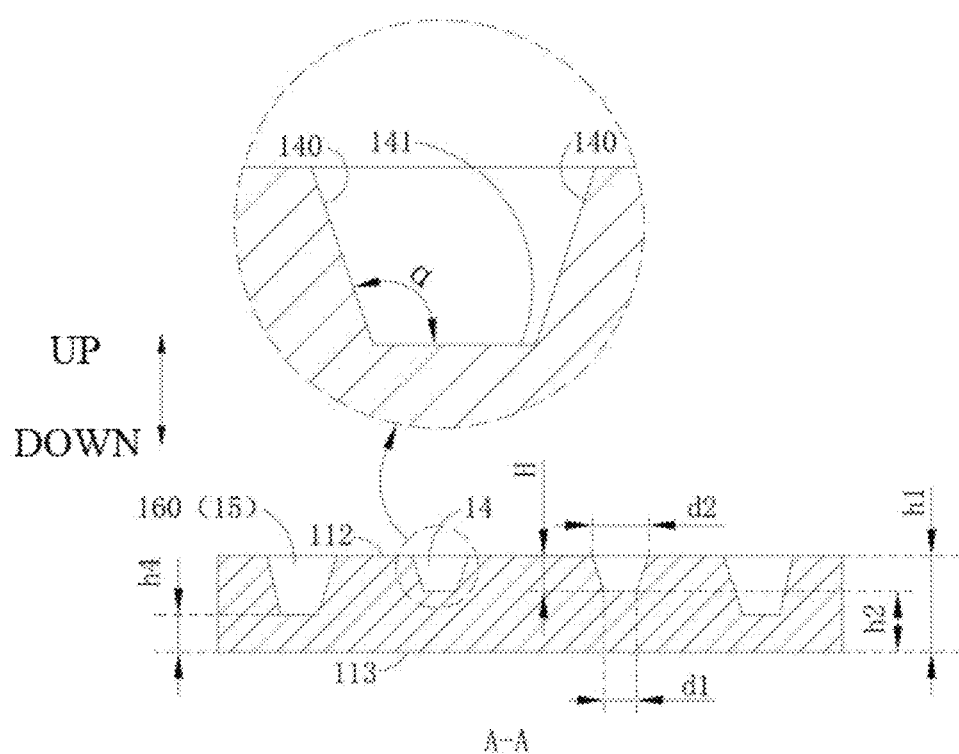
FIG. 5 is a cutaway view of FIG. 4 along direction A-A.
Figure 6:
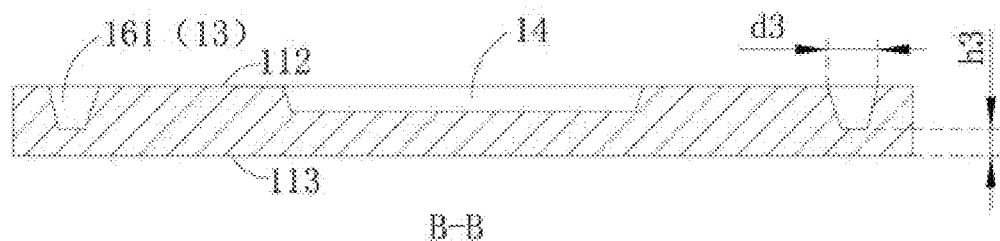
FIG. 6 is a cutaway view of FIG. 4 along direction B-B.
Figure 7:
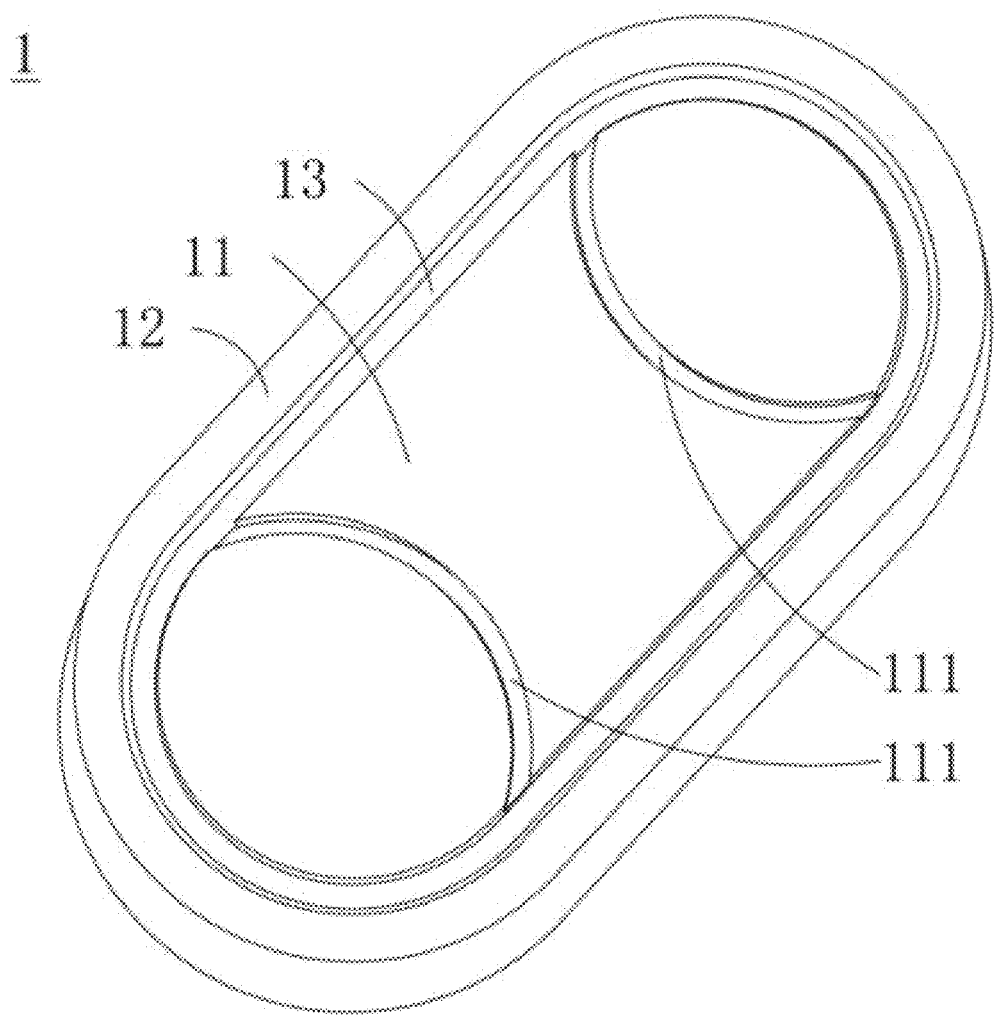
FIG. 7 is a schematic structural diagram of another explosion-proof sheet in an embodiment of the present disclosure.
Figure 8:
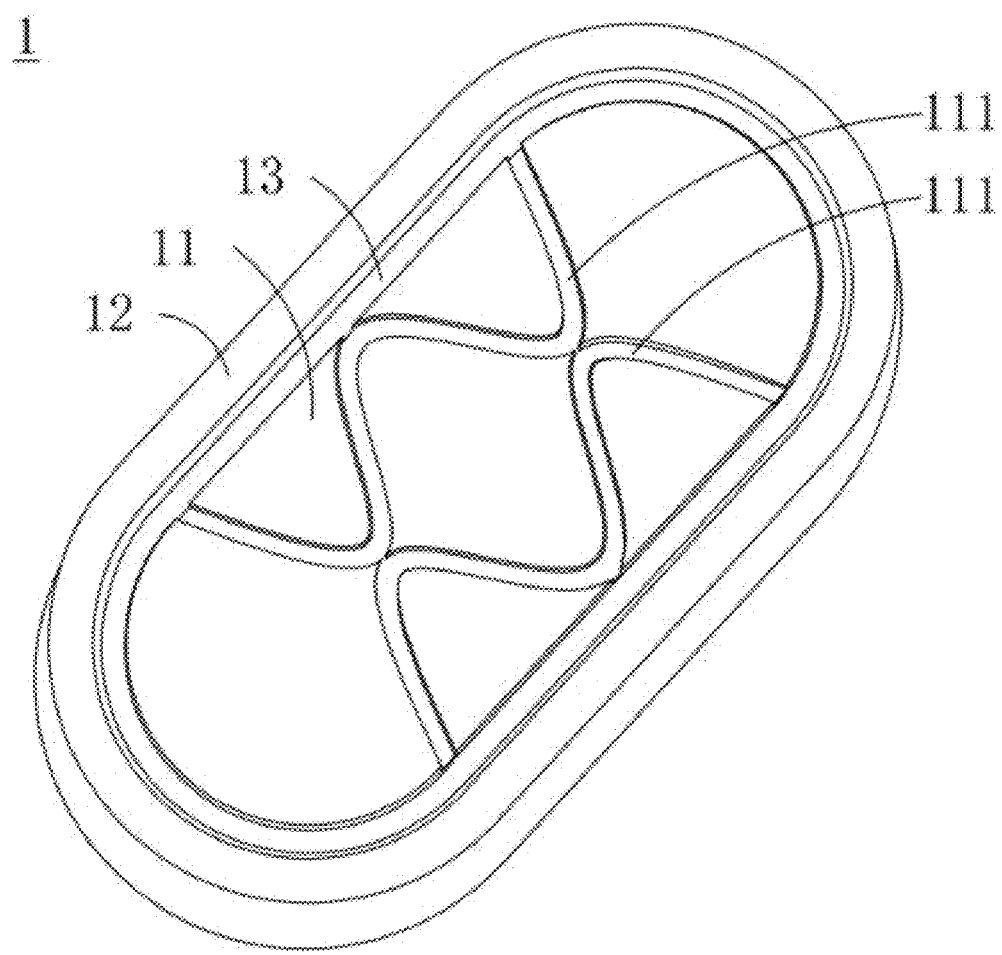
FIG. 8 is a schematic structural diagram of a further explosion-proof sheet in an embodiment of the present disclosure.

Continuing to refer to FIG. 4 to FIG. 6, the inventors have discovered, through research and experimentation, that the size of the groove 14 is of critical significance to the improved structural strength and the deformation generated when the force exerted on the main body portion 11 exceeds the threshold. Based on this, this embodiment also limits the size of the groove 14 to meet the requirement for the anti-deformation capacity.

For example, the width of the groove bottom 141 of the groove 14 is d1 which may satisfy: d1≤0.7 mm, so that the strengthening region 111 has improved structural strength, which avoids such a phenomenon that the strengthening region 111 also cracks when the cracking portion 13 cracks. Therefore, the reliability of the secondary battery 100 during use is improved.

Exemplarily, the width d1 of the groove bottom 141 of the groove 14 may be 0.1 mm 0.2 mm, 0.3 mm, 0.4 mm, 0.5 mm, 0.6 mm or 0.7 mm, as long as the strengthening region 111 has high strength to avoid the strengthening region 111 from cracking when the cracking portion 13 cracks. The present disclosure does not specifically limit the width d1 of the groove bottom 141 of the groove 14.

For example, the width d1 of the groove bottom 141 of the groove 14 is 0.4 mm. Therefore, the groove bottom 141 of the groove 14 may not be overly large, which can ensure that the main body portion 11 has improved structural strength. The main body portion 11 can resist the natural deformation of the explosion-proof sheet 1 when the force exerted does not exceed the threshold. The main body portion 11 may easily generate great deformation when the force exerted on the main body portion 11 exceeds the threshold, so the cracking portion 13 cracks timely.

Further, it can be known from the foregoing that the section of the groove 14 is of the inverted trapezoid structure, and the width of the groove 14 gradually decreases from the upper surface 112 of the main body portion 11 to the lower surface 113 of the main body portion 11. Therefore, the width of the groove 14 located on the upper surface 112 of the main body portion 11 is d2 which may satisfy: 0<d2≤1 mm. When the width d2 is between 0 and 1 mm, the strengthening region 111 has improved strength, which avoids such a phenomenon that the strengthening region 111 also cracks when the cracking portion 13 cracks. Therefore, the reliability of the secondary battery 100 during use is improved.

Exemplarily, the width d2 of the groove 14 located on the upper surface 112 of the main body portion 11 may be 0.1 mm, 0.2 mm, 0.3 mm, 0.4 mm, 0.5 mm, 0.6 mm, 0.7 mm, 0.8 mm, 0.9 mm or 1 mm, as long as the strengthening region 111 has improved strength, which avoids such a phenomenon that the strengthening region 111 also cracks when the cracking portion 13 cracks. The present disclosure does not specifically limit the width d2 of the groove 14 located on the upper surface 112 of the main body portion 11.

For example, the width d2 of the groove 14 located on the upper surface 112 of the main body portion 11 is 0.5 mm. Therefore, the strengthening region 111 may not be overly large, which can ensure that the overall structural strength of the main body portion 11 is more reasonable. When the force exerted on the main body portion 11 does not exceed the threshold, the entire main body portion 11 deforms less. When the force exerted on the main body portion 11 exceeds the threshold, the main body portion 11 easily generates great deformation, so that the cracking portion 13 cracks timely.

Further, considering that the groove 14 is mainly formed on the main body portion 11 in a squeezed manner, a depth of the groove 14 also has impact on the anti-deformation capacity of the main body portion 11. Therefore, the depth of the groove 14 is defined to be H, which may satisfy: H≥0.5 mm. When the depth H of the groove 14 is between 0.5 mm and 0.1 mm, the strengthening region 111 has improved structural strength, which avoids such a phenomenon that the strengthening region 111 also cracks when the cracking portion 13 cracks.

It should be noted that the depth H of the groove 14 includes, but is not limited to, 0.5 mm, 0.55 mm, 0.6 mm, 0.65 mm, 0.7 mm, 0.7 mm, 0.8 mm, 0.85 mm, 0.9 mm, 0.95 mm or 0.1 mm. The present disclosure does not specifically limit the depth H of the groove 14.

For example, a depth of the strengthening region 111 is 0.5 mm, which is not overly large and is conductive to machining the strengthening region 111. Moreover, the structural strength of the main body portion 11 can also be ensured, and the natural deformation of the main body portion 11 is avoided. The main body portion 11 can well resist the natural deformation of the explosion-proof sheet 1 when the force exerted does not exceed the threshold. The main body portion 11 may easily generate great deformation when the force exerted on the main body portion 11 exceeds the threshold, so the cracking portion 13 cracks timely.

In some implementations, a width of one side of the cracking portion 13 facing towards the upper surface 112 is d3. The width d2 of the portion of the groove 14 located on the upper surface 112 and the width d3 of the side of the cracking portion 13 facing towards the upper surface 112 may satisfy: d2≤d3. The width d3 of the cracking portion 13 is less than or equal to the width d2 of the groove 14 located on the upper surface 112, so that the structural strength of the cracking portion 13 is less than that of the strengthening region 111. Therefore, when the pressure on the explosion-proof sheet 1 is greater than the threshold, the cracking portion 13 can be ensured to deform and crack. That is, the explosion-proof sheet 1 can be ensured to start to crack from the cracking portion 13. The cracking process of the explosion-proof sheet 1 is highly controllable, and the explosion-proof sheet 1 is used stably and has high safety.

In some optional implementations, along an extending direction of the strengthening region 111, the strengthening region 111 may have a first end 1111 and a second end 1112; and the first end 1111 and/or the second end 1112 extends to an end part of the cracking portion 13 and is communicated to the cracking portion 13. That is, the first end 1111 extends to the end part of the cracking portion 13 and is communicated to the cracking portion 13, or the second end 1112 extends to the end part of the cracking portion 13 and is communicated to the cracking portion 13, or the first end 1111 and the second end 1112 respectively extend to the end part of the cracking portion 13 and are communicated to the cracking portion 13, so that the strengthening effect of the strengthening region 111 on the structural strength of the main body portion 11 can extend to the end part of the cracking portion 13. When the pressure on the explosion-proof sheet 1 exceeds the threshold, since the structural strength of the end part of the cracking portion 13 is greater than that of the middle part of the cracking portion 13, the anti-deformation capacity of the cracking portion 13 is lower, and the middle part of the cracking portion 13 deforms easily. It is easy for the cracking portion 13 to crack timely and quickly when the pressure exceeds the threshold; and the explosion-proof sheet 1 has high pressure sensitivity and makes a quick response, and the function of timely discharging high-temperature high-pressure gas inside the secondary battery 100 can be realized.

In some other optional implementations, the explosion-proof sheet 1 may also include a connection portion 15. The connection portion 15 is located between the fixing portion 12 and the main body portion 11 and is connected to the fixing portion 12 and the main body portion 11; the connection portion 15 is connected to an end part of the cracking portion 13; a thickness of the connection portion 15 is h4; a thickness of the cracking portion 13 is h3; and the thickness of other positions of the main body portion 11 is h1. Thickness h1, thickness h3 and thickness h4 may satisfy: h1>h4>h3. The structural strength of the cracking portion 13 is less than that of the connection portion 15, and the structural strength of the connection portion 15 is less than that of the main body portion 11, so that it is easier for the cracking portion 13 to crack immediately when the pressure is greater than the threshold, thus further improving the cracking accuracy of the explosion-proof sheet 1. Furthermore, when the cracking portion 13 cracks, the main body portion 11 may be still connected to the fixing portion 12 via the connection portion 15. That is, the main body portion 11 may not be separated from the battery, so that the main body portion 11 can be avoided from being ejected out of the secondary battery 100, and the use safety of the secondary battery 100 is higher.

Further, the thickness of the connection portion 15 is less than that of the main body portion 11, that is, the structural strength of the connection portion 15 is less than that of the main body portion 11. Therefore, when the pressure inside the battery exceeds the threshold, the cracking portion 13 can crack; and at the same time, when the pressure inside the secondary battery 100 dramatically increases to cause the pressure on the explosion-proof sheet 1 to instantly far more exceed the threshold, the connection portion 15 can be used as a second-stage cracking mechanism, that is, the connection portion 15 can also crack to make a connection area between the main body portion 11 and the fixing portion 12 smaller or to separate the entire main body portion 11 from the fixing portion 12. Thus, a produced crack for discharging gas has a larger area, and the gas discharge efficiency is higher. The battery can more quickly reach a safe state where internal and external gas pressures are balanced.

In some implementations, there may be one or more cracking portions 13, and there may be one or more connection portions 15. It can be understood that the number of the cracking portions 13 and the number of the connection portions 15 can meet the requirements for the gas discharge function and the safety of the explosion-proof sheet 1. This embodiment does not specifically limit the number of the cracking portions 13 and the number of the connection portions 15.

Exemplarily, there may be a plurality of cracking portions 13 and a plurality of connection portions 15. The plurality of cracking portions 13 are disposed at intervals, and the plurality of connection portions 15 are respectively connected between the plurality of cracking portions 13. Each of the plurality of connection portions 15 has an equal thickness, so that the structural strength of each connection portion 15 is equal, and the stress on the entire explosion-proof sheet 1 is more uniform. Or, the thickness of at least one connection portion 15 is less than the thicknesses of other connection portions 15, so that the structural strength of at least one connection portion 15 is less than that of other connection portions 15. When the pressure inside the battery dramatically increases to cause the pressure on the explosion-proof sheet 1 to instantly far more exceed the threshold, starting from the connection portion 15 with the lowest strength, the connection portion 15 can also crack with the cracking portion 13, so that the area of the crack produced between the main body portion 11 and the fixing portion 12 can be gradually enlarged, and other connection portions 15 absorb more energy to reduce the potential energy of the main body portion 11 for being separated from the fixing portion 12, and to improve the use safety of the explosion-proof sheet 1.

According to the foregoing, the strengthening region 111 may have a first end 1111 and a second end 1112. Optionally, at this time, the first end 1111 and the second end 1112 may extend to a joint of the connection portion 15 and the cracking portion 13, or extend to the connection portion 15 and are communicated to the connection portion 15. Thus, the strengthening effect of the strengthening region 111 on the structural strength of the main body portion 11 can extend to a joint between the main body portion 11 and the connection portion 15 to further increase a structural strength difference between the connection portion 15 and the cracking portion 13. Therefore, when the pressure on the explosion-proof sheet 1 exceeds the threshold, it is easier for the cracking portion 13 to quickly crack.

It can be understood that when the cracking portion 13 of the explosion-proof sheet 1 crack (that is, a crack is produced between the main body portion 11 and the fixing portion 12), the fixing portion 12 is still fixedly connected to the mounting slot. The main body portion 11 moves relative to the fixing portion 12, so that the main body portion 11 is at least partially separated from the fixing portion 12 to produce a crack. Based on this, in order to allow the main body portion 11 to be easily at least partially separated from the fixing portion 12, for example, a periphery of the main body portion 11 may not be directly connected to the fixing portion 12. That is, the connection portion 15 and the cracking portion 13 may be connected to form an annular groove 16. The annular groove 16 is annularly arranged at the periphery of the main body portion 11, and the fixing portion 12 is annularly arranged at a periphery of the annular groove 16.

Optionally, in order to avoid stress concentration in the process of pressing the explosion-proof sheet 1, thus avoiding the annular groove 16 from cracking in advance at a stress concentration part, the shape of the annular groove 16 should change gently along the extending direction. Exemplarily, the annular groove 16 may be an elliptical groove; the elliptical groove includes two straight grooves 160 and two arc grooves 161; the two straight grooves 160 are parallel to each other; the two arc grooves 161 are respectively connected to two ends of the two straight grooves 160, so that the two straight grooves 160 have no shape change in the extending direction, and the stress concentration occurs difficultly. The shapes of the arc grooves 161 change gently in the extending direction, so that the stress concentration can be greatly reduced.

Further, the straight grooves 160 may be formed into the connection portion 15, and the arc grooves 161 may be formed into the cracking portion 13, so that when the explosion-proof sheet 1 is pressed, stress concentration difficultly occurs at the connection portion 15, and the explosion-proof sheet 1 can be avoided from cracking first at the connection portion 15. The stress concentration at the cracking portion 13 can be greatly relieved, so that the phenomenon that the cracking portion 13 cracks in advance due to an extremely high local stress caused by the stress concentration when the pressure on the explosion-proof sheet 1 has not reached the threshold, and early scrapping of the secondary battery 100 is avoided.

According to the explosion-proof sheet 1 disclosed in the embodiment of the present disclosure, the explosion-proof sheet 1 includes the cracking portion 13 connected between the fixing portion 12 and the main body portion 11, so that when the pressure on the explosion-proof sheet 1 is overly high (that is, a gas pressure in an accommodating cavity of the housing 3 exceeds the threshold), the cracking portion 13 can crack to enable the high-temperature high-pressure gas in the housing 3 to be timely discharged and to control the cracking process of the explosion-proof sheet 1 at the same time. The degree of cracking of the explosion-proof sheet 1 is decreased, so as to reduce the influence caused when the explosion-proof sheet 1 is damaged. Moreover, since the main body portion 11 is provided with the strengthening region 111, the structural strength of the main body portion 11 can be enhanced. Therefore, under an external force on the explosion-proof sheet 1, overall deformation of the main body portion 11 and the strengthening region 111 is reduced, thus effectively reducing the deformation of the explosion-proof sheet 1 under different pressures and lowering the aging rate of the explosion-proof sheet 1. The following phenomenon is avoided: the cracking portion 13 cracks in advance when the pressure has not reached a threshold, so as to prolong the service life of the battery.

In addition, the first end 1111 and the second end 1112 of the strengthening region 111 extend to the end part of the cracking portion 13 or are communicated to the connection portion 15, thereby increasing the structural strength differences between the middle part of the cracking portion 13 and the main body portion 11 as well as the connection portion 15. When the pressure on the explosion-proof sheet 1 exceeds the threshold, it is easier for the middle part of the cracking portion 13 to generate great deformation, so that the cracking portion 13 can crack more quickly and timely, and the explosion-proof sheet 1 makes a quick feedback to the pressure. The use safety of the secondary battery 100 is higher.

What is claimed is:

1. An explosion-proof sheet of a secondary battery, wherein the secondary battery comprises a top cover provided with an explosion-proof hole and the explosion-proof sheet is assembled on the top cover and is used to close the explosion-proof hole, the explosion-proof sheet comprising:
   a main body portion opposite to the explosion-proof hole, a strengthening region being formed on the main body portion;
   a fixing portion arranged around the main body portion and operatively connected to a periphery of the explosion-proof hole; and
   a cracking portion located between the fixing portion and the main body portion and connected to the fixing portion and the main body portion;
   wherein the strengthening region has a first end and a second end, at least one of the first end or the second end extends to an area between the fixing portion and the main body portion;
   in a thickness direction of the explosion-proof sheet, a thickness of the main body portion at other positions except for the strengthening region is h1; a thickness of the main body portion at the strengthening region is h2; and a thickness of the cracking portion is h3,
   wherein h1, h2 and h3 satisfy the relationship: $h1 \geq 2h2$, $h2 \geq h3$.

2. The explosion-proof sheet according to claim 1, wherein a material density of the main body portion at the strengthening region is greater than that of the main body portion at other positions.

3. The explosion-proof sheet according to claim 1, wherein:
the strengthening region is formed on the main body portion in a squeezed manner, and
the strengthening region is formed into a groove recessed relative to an upper surface of the main body portion, on the main body portion.

4. The explosion-proof sheet according to claim 3, wherein:
the strengthening region extends from a middle part of the main body portion towards two sides of the main body portion;
a projection area of the strengthening region on the main body portion is S1; and
an area of a surface of the main body portion that is provided with the strengthening region is S2,
wherein S1 and S2 satisfy the relationship: $5 \leq S2/S1 \leq 10$.

5. The explosion-proof sheet according to claim 4, wherein:
a plurality of strengthening regions are provided, which are symmetrically arranged on the main body portion about a center of the main body portion;
at least two strengthening regions are communicated in the middle part of the main body portion to form a communicated region; and
an area of the communicated region is S3,
wherein S2 and S3 satisfy the relationship: $80 \leq S2/S3 \leq 600$.

6. The explosion-proof sheet according to claim 3, wherein:
a width of the groove is gradually increased along a direction from a lower surface of the main body portion to the upper surface of the main body portion;
the upper surface and the lower surface are two opposite surfaces along the thickness direction of the main body portion; and
the upper surface is a surface facing away from the inside of the secondary battery.

7. The explosion-proof sheet according to claim 6, wherein:
the groove has an inverted trapezoid section; and
an included angle $\alpha$ between a side wall and groove bottom of the groove satisfies: $90° < \alpha < 180°$.

8. The explosion-proof sheet according to claim 7, wherein:
a depth of the groove is H, $H \geq 0.5$ mm;
a width of the groove bottom of the groove is d1, $d1 \leq 0.7$ mm; and
a width of the groove located on the upper surface of the main body portion is d2, wherein d2 satisfies the relationship: $d2 \leq 1$ mm.

9. The explosion-proof sheet according to claim 7, wherein:
a width of a portion of the groove located on the upper surface is d2, and
a width of one side of the cracking portion facing towards the upper surface is d3,
wherein d2 and d3 satisfy the relationship: $d2 \leq d3$.

10. The explosion-proof sheet according to claim 3, wherein:
at least one of the first end or the second end extends to an end part of the cracking portion and is communicated to the cracking portion.

11. The explosion-proof sheet according to claim 3, wherein:
the explosion-proof sheet further comprises a connection portion located between the fixing portion and the main body portion and connected to the fixing portion and the main body portion;
the connection portion is connected to an end part of the cracking portion;
a thickness of the connection portion is h4;
a thickness of the cracking portion is h3; and the thickness of other positions of the main body portion is h1,
wherein h1, h3 and h4 satisfy the relationship: $h1 > h4 > h3$.

12. The explosion-proof sheet according to claim 11, wherein:
a plurality of cracking portions and a plurality of connection portions are provided;
the plurality of cracking positions are disposed at intervals;
the plurality of connection portions are respectively connected between the plurality of cracking positions; and
the thickness of each of the plurality of connection portions is equal, or the thickness of at least one connection portion is less than the thicknesses of other connection portions.

13. The explosion-proof sheet according to claim 11, wherein:
the first end and the second end extend to a joint of the connection portion and the cracking portion, or the first end and the second end extend to the connection portion and are communicated to the connection portion.

14. The explosion-proof sheet according to claim 11, wherein:
the connection portion and the cracking portion are connected to form an annular groove which is an elliptical groove;
the elliptical groove comprises two straight grooves and two arc grooves;
the two straight grooves are parallel to each other; the two arc grooves are respectively connected to two ends of the two straight grooves; and
the straight grooves are formed into the connection portion, and the arc grooves are formed into the cracking portion.

15. The explosion-proof sheet according to claim 1, wherein:
in a direction perpendicular to the explosion-proof sheet, an upper surface of the main body portion is a surface facing away from the inside of the secondary battery;
the strengthening region is formed on the upper surface of the main body portion;
a lower surface of the main body portion is a plane; and
the lower surface and the upper surface face away from each other.

16. A secondary battery comprising:
a top cover, wherein an explosion-proof hole is formed in the top cover, and
the explosion-proof sheet according to claim 1,
wherein:
the fixing portion of the explosion-proof sheet is connected to a periphery of the explosion-proof hole;
the main body portion of the explosion-proof sheet is opposite to the explosion-proof hole; and
the cracking portion of the explosion-proof sheet is located in the explosion-proof hole.

* * * * *